Dec. 12, 1944.   R. E. MOULE   2,364,745
MOLD EQUIPMENT
Filed Feb. 16, 1940

INVENTOR
Rex E. Moule.
BY
his ATTORNEYS

Patented Dec. 12, 1944

2,364,745

UNITED STATES PATENT OFFICE 2,364,745

MOLD EQUIPMENT

Rex E. Moule, Dayton, Ohio, assignor to General Motors Corporation, Detroit, Mich., a corporation of Delaware Application February 16, 1940, Serial No. 319,315

2 Claims. (Cl. 18—42)

This invention relates to extrusion mold equipment, and particularly mold equipment used in the molding of plastics and the like.

It is an object of invention to provide a mold having a surface therein sufficiently smooth to cause the surface of plastic molded therein to attain a smooth surface approximating a mirror finish.

In carrying out the above object it is a further object to provide a glass insert for the mold which insert has a mirror-like surface thereon.

It is a still further object to provide a surface of the mold with a nitrided steel surface having a high polish thereon which polish is transmitted to the surface of the molded plastic.

Another object while carrying out the above objects is to provide a ductile metal gasket material around the outer edge of the glass insert by electrodeposition so that the insert may be placed in the mold and be fluid tight therewith.

Further objects and advantages of the present invention will be apparent from the following description, reference being had to the accompanying drawing wherein a preferred embodiment of one form of the present invention is clearly shown.

There has long been a need in industry for non-breakable mirrors and the like, such as mirrors made from plastic material. Heretofore it has been impossible to formulate a mirror from plastic material due to the fact the usual mold equipment used in plastic molding has not been sufficiently polished and smooth to impart a mirror surface to the plastic and the plastic being relatively soft is incapable of subsequently polishing and buffing such as the operation carried out on glass when making mirrors therefrom. This smooth surface is especially necessary on the side of the plastic which is to be silvered, such silvering being carried out by deposition of the silver from silver nitrate solution, by cathode sputtering, or any other well known method.

I have found by experiment that mirrors formed from plastic material, due to the fact that the silvered surface thereof does not have a smooth finish thereon, were quite imperfect and were not desirable in their use. Furthermore, I have found that the material used in conventional plastic molds is incapable of being polished to the finish that is required to make a good mirror. In order to overcome this difficulty I have discovered that glass such as Pyrex glass, which has had one surface thereof polished may be inserted in an extrusion mold to form a perfect mold surface for mirrors and the like. The plastic is then extruded into the mold and cooled whereby the surface of the plastic which contacts the smooth surface of glass attains a finish very similar to the surface of glass and thereby eliminates the necessity of subsequent polishing operations. In this manner the polished molded surface of the plastic may be directly silvered. I have further discovered that nitrided steel with or without a chromium finish thereon or stainless steel having a high polish thereon is very desirable as a mold insert and in this connection I propose to use nitrided steel on one side of the mold opposed to the glass surface so that plastic material extruded therebetween attains a smooth surface on either side thereof.

Plastic mirrors have a high utility, particularly as rear vision mirrors for automobiles and the like wherein there is a great demand for substantially non-breakable material; similarly, small hand mirrors, etc., made from non-breakable material such as plastic, are desirable.

Figure 1:
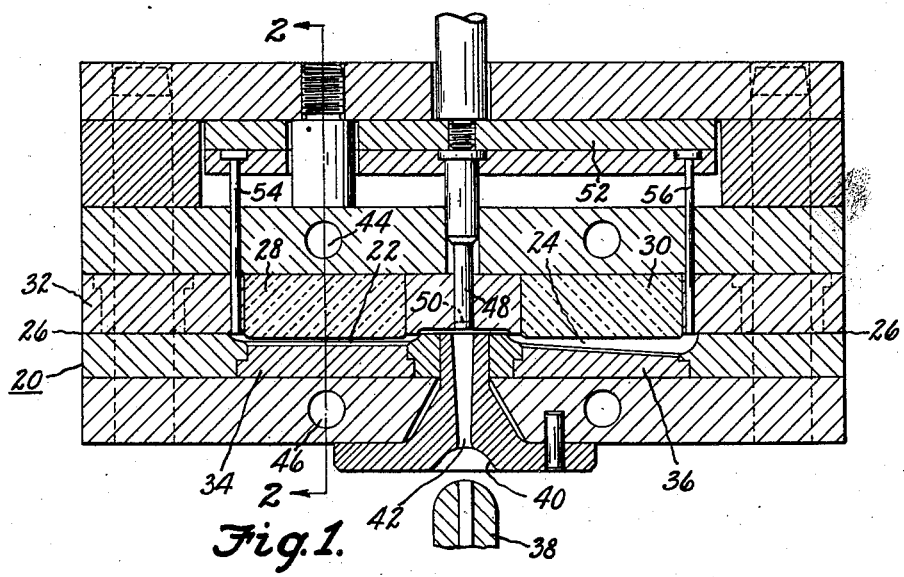
Fig. 1 is a cross sectional view through an extrusion mold showing the details of construction thereof.
Figure 2:
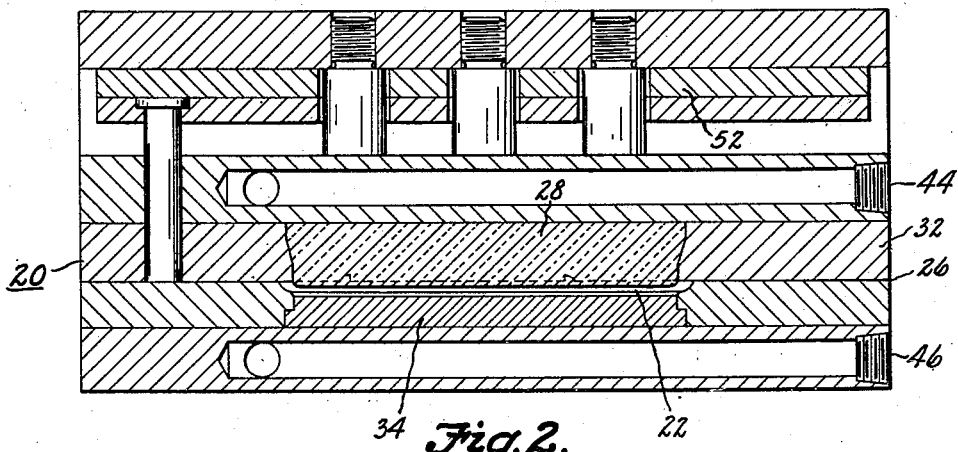
Fig. 2 is a view taken on the line 2—2 of Fig. 1.
Figure 3:
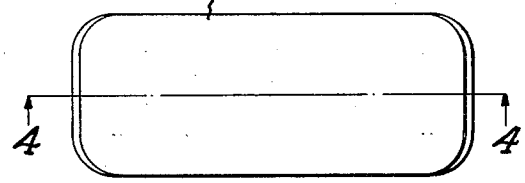
Fig. 3 is a plan view of one surface of the glass insert.
Figure 4:
Fig. 4 is a section taken on the line 4—4 of Fig. 3, showing particularly the plated copper gasket.

Referring to the drawing and more particularly to Fig. 1, an extrusion mold 20 is shown having two cavities 22 and 24 therein. Cavity 22 is designed to make a sheet or plate of molded plastic having a constant cross section while cavity 24 is formed to make a plate having a wedge shape cross section such a plate being used in non-glare type of rear vision mirrors. It is apparent that both cavities 22 and 24 may be the same if desired. The parting line of mold 20 is on line 26 and in this connection the part below the line 26 is stationary while the part above the line 26 may be moved upwardly. Glass plates 28 and 30 are inserted in the upper part of the mold and due to their tapering edges, as shown in Fig. 4, may be forced down in the cavities in the mold section 32 and form fluid tight joints therearound due to the fact that the bottom surfaces of the plates 28 and 30 are of slightly less areas then the top areas of the plates. To further aid in preventing leakage around the plates 28 and 30, copper is preferably plated directly on the surface of the edges of the plates in an appreciable thickness so that when the glass plates 28 and 30 are forced into the apertures in mold plate 32, the copper due to its ductility deforms slightly and acts as a seal to form a fluid tight joint. The opposed surfaces of the mold cavities are formed from nitrided steel plates 34 and 36 inserted in the lower portion of the mold 20.

In operation when the mold 20 is closed, as shown in Fig. 1, a nozzle 38 is moved upwardly into contact with surface 40 of mold 20 which surface is lapped to the surface of nozzle 38 to form a fluid tight joint therebetween. Plastic material is extruded from the nozzle in the mold through passage 42 and into the cavities of the mold. A cooling medium is preferably circulated through the ducts 44 and 46 and cools the plastic in the cavities. After the cavities have been filled and the plastic cooled therein the upper portion of the mold 20 is raised with respect to the lower portion thereof and the plastic sprue in the tapered hole 42 is drawn upwardly on a sprue pin 48. Pin 48 has a small hook at 50 which holds the sprue thereto until it has been withdrawn from the tapered sprue passage 42. Likewise the molded plastic objects adhere to the glass plates 28 and 30 and are raised upwardly a predetermined distance until the upper portion of the mold hits a stop, whereupon the ejection plate 52 moves downwardly and breaks off the sprue on the sprue pin 48 and simultaneously causes ejection pins 54 and 56 attached thereto to move downwardly and break the mold plastic away from the glass surfaces 28 and 30.

As previously stated when plastic material is molded in a mold of this character it attains a surface thereon substantially like the surface against which it is molded, and in this case being molded against a highly polished glass surface, the plastic carries a similar surface. The molded plastic adheres to the upper portion of the mold due to the sprue and general shape of the cavity which permits upward movement of the mold portion to carry the molded objects upwardly out of the cavities.

I have found that any plastic, such as cellulose acetate, methyl methacrylate, polystyrene, etc., may be molded in a mold of any character described, but I prefer to use polystyrene when making mirror materials since polystyrene has suitable characteristics to permit deposition of silver directly from AgNO₃ and attains a fine polish on the surfaces thereof. Polystyrene may be more accurately defined as a poly-vinyl-benzene.

When copper plating the edges of the glass inserts I have discovered that it increases the tendency of the copper to adhere to the plate by first silver plating the edges prior to the copper plating.

While the description of the mold as set forth herein is directed to a mold for making mirrors it is apparent that molds embodying nitrided steel or glass molding surfaces therein or combinations thereof may be used in molding a number of various types of plastic objects wherein surfaces are desired having a high polish thereon whether or not the surface is to be subsequently silvered and it is to be understood that the scope of this invention is not to be limited by the description, but is sufficiently broad to embrace any type of mold equipment having glass and/or nitrided steel inserts therein which carry a polished surface, which surface is imparted to the molded object.

While the form of embodiment of the present invention as herein disclosed constitutes a preferred form, it is to be understood that other forms might be adopted all coming within the scope of the claims which follow.

What is claimed is as follows:

1. Mold equipment for use in the molding of plastics wherein an exceptionally smooth, molded surface is desired on the plastic article comprising in combination; a closed mold consisting of two separable portions, each of said portions containing a portion only of the mold cavity therein, cooling means within each of said portions consisting of communicating ducts adapted for the circulation of the cooling medium therethrough, a smooth, hard mold surface carried by at least one of said portions and inserted in said portion for forming one wall of the cavity and consisting of a heat-resisting glass insert having a highly polished surface thereon, a layer of copper plated on the edges of said glass insert which acts as a gasket for sealing the insert to the mold when the insert is forced into the mold portion and supply means connecting with said cavity for filling the cavity with a flowable plastic material, whereby articles molded in said cavity from said plastic material have a surface transferred thereto similar to the said polished surface of said insert.

2. Mold equipment for use in the molding of plastics and the like wherein very smooth surfaces are desired comprising in combintion; two mold portions adapted to interfit with one another to form a closed mold each of said portions carrying a complementary section of the mold cavity therein, one of said portions having a heat-resisting, highly polished glass insert therein to form one portion of the mold cavity and the other of said mold portions including a highly polished nitrided steel insert therein for forming another portion of said cavity wall, said glass insert and said nitrided steel insert being so arranged as to be opposed to one another whereby articles formed in said cavity have opposed highly polished surfaces thereon, and supply means for supplying a flowable plastic to the cavity for molding purposes.

REX E. MOULE.